US006823768B2

(12) United States Patent
Tagami

(10) Patent No.: US 6,823,768 B2
(45) Date of Patent: Nov. 30, 2004

(54) NITRIDED SURFACE LAYER ON A SWASH PLATE BOSS

(75) Inventor: Shinji Tagami, Isesaki (JP)

(73) Assignee: Sanden Corporation, Gunma (JP)

( * ) Notice: Subject to any disclaimer, the term of this patent is extended or adjusted under 35 U.S.C. 154(b) by 32 days.

(21) Appl. No.: 10/300,806

(22) Filed: Nov. 21, 2002

(65) Prior Publication Data

US 2003/0095874 A1 May 22, 2003

(30) Foreign Application Priority Data

Nov. 22, 2001 (JP) .................................... P2001-356932
Dec. 6, 2001 (JP) .................................... P2001-372187

(51) Int. Cl.[7] ............................ F01B 3/00; F04B 17/00; F04B 1/26; F16H 23/00; F16H 35/08

(52) U.S. Cl. ........................ 92/71; 417/269; 417/222.1; 74/60; 74/839

(58) Field of Search ............................. 417/269, 222.1; 92/71; 91/499, 505; 74/60, 839

(56) References Cited

U.S. PATENT DOCUMENTS 4,008,005 A 2/1977 Hiraga
4,979,877 A 12/1990 Shimizu
5,062,772 A 11/1991 Shimizu et al.
5,106,271 A 4/1992 Shimizu et al.
5,626,463 A * 5/1997 Kimura et al. .............. 417/269
5,809,863 A * 9/1998 Tominaga et al. ............. 92/57
6,293,761 B1 * 9/2001 Ganster et al. .......... 417/222.1
6,302,665 B1 * 10/2001 Esumi et al. ............... 418/178

FOREIGN PATENT DOCUMENTS

JP 5-60058 * 3/1993 ............. F04B/1/20
JP 2000-213437 * 8/2000 .......... F02M/59/04

* cited by examiner

*Primary Examiner*—Justine R. Yu
*Assistant Examiner*—Timothy P. Solak
(74) *Attorney, Agent, or Firm*—Baker Botts L.L.P.

(57) ABSTRACT

A swash plate for a swash plate-type, variable displacement compressor, such that the compressor is driven by a drive shaft having a shaft axis. The swash plate includes a boss that is penetrated slidably by the drive shaft. The boss is connected slidably to a rotor that is fixed to the drive shaft, whereby a variable, oblique angle is formed between a surface of the swash plate and the shaft axis. The boss is connected securely within the swash plate and comprises a nitrided surface layer.

12 Claims, 1 Drawing Sheet

NITRIDED SURFACE LAYER ON A SWASH PLATE BOSS

BACKGROUND OF THE INVENTION

1. Field of the Invention

The present invention relates to a swash plate for a swash plate-type, variable displacement compressor for use in an automobile air conditioning system. More particularly, it relates to a boss of the swash plate.

2. Description of Related Art

A known boss of a swash plate for a swash plate-type, variable displacement compressor for use in an automobile air conditioning system is penetrated slidably by a drive shaft, and is connected slidably to a rotor fixed to the drive shaft. The boss has a penetration hole penetrated by the drive shaft, within which the drive shaft slides axially when the compressor is working under a heavy load. Consequently, the portion of the boss surrounding the penetration hole has a high degree of hardness. Therefore, in such bosses, the portion of the boss surrounding the penetration hole may be hardened by an induction hardening process or the whole of the boss may be hardened by carburizing.

If only a portion of the boss surrounding the penetration hole is hardened by the induction hardening process, the whole of the boss is made of a relatively hard material to endure the induction hardening process. However, it may become difficult to process such a boss made substantially of a relatively hard material. Moreover, in such case, the boss may become deformed because the boss is hardened only on the portion of the boss surrounding the penetration hole by induction hardening. Similarly, when the whole of the boss is hardened by carburizing, the boss may become deformed because the boss is heat-treated at a relatively high temperature. Thus, when the boss is connected securely by press-fitting within the body plate of the swash plate, the inserted portion of the boss may require reprocessing in order to restore it to its original shape because a high degree of precision is required in assembling the parts of a swash plate-type compressor. In addition, when only the portion of the boss surrounding the penetration hole is hardened by induction hardening, the inserted portion of the boss may be of the same hardness as that of the body plate because the inserted portion of the boss may not be heat-treated. Therefore, the inserted portion of the boss may bite against the body plate when the inserted portion of the boss is inserted within the body plate, and, consequently, the boss may not connect securely within the body plate.

SUMMARY OF THE INVENTION

Therefore, a need has arisen for a boss of a swash plate for a swash plate-type variable displacement compressor for use in an automobile air conditioning system that overcomes these and other shortcomings of the related art. It is technical advantage of the present invention that it facilitates the processing of the boss and that it allows the boss to connect more precisely within the body plate. In particular, the boss may connect securely by press-fitting within the body plate.

In an embodiment, this invention is a swash plate for a swash plate-type, variable displacement compressor, such that the compressor is driven by a drive shaft having a shaft axis. The swash plate comprises a boss that is penetrated slidably by the drive shaft. The boss is connected slidably to a rotor that is fixed to the drive shaft, whereby a variable, oblique angle is formed between a surface of the swash plate and the shaft axis. The boss is connected securely within the swash plate and comprises a nitrided surface layer, e.g., a layer of steel containing nitrides.

In another embodiment, this invention is a swash plate for a swash plate-type, variable displacement compressor, such that the compressor is driven by a drive shaft having a shaft axis. The swash plate comprises a boss that is penetrated slidably by the drive shaft. The boss is connected slidably to a rotor that is fixed to the drive shaft, whereby a variable, oblique angle is formed between a surface of the swash plate and the shaft axis. The boss is connected securely within the swash plate and comprises a sulfur nitrided surface layer, e.g., a layer of steel containing compounds of sulfur, nitrogen, and a metal.

In still another embodiment, this invention is a swash plate-type, variable displacement compressor is driven by a drive shaft having a shaft axis. The swash plate comprises a swash plate and a boss. The boss is penetrated slidably by the drive shaft and is connected slidably to a rotor that is fixed to the drive shaft, whereby a variable, oblique angle is formed between a surface of the swash plate and the shaft axis. The boss is connected securely within the swash plate and comprises a nitrided surface layer, e.g., a layer of steel containing nitrides.

In yet another embodiment, this invention is a swash plate-type, variable displacement compressor is driven by a drive shaft having a shaft axis. The swash plate comprises a swash plate and a boss. The boss is penetrated slidably by the drive shaft and is connected slidably to a rotor that is fixed to the drive shaft, whereby a variable, oblique angle is formed between a surface of the swash plate and the shaft axis. The boss is connected securely within the swash plate and comprises a sulfur nitrided surface layer, e.g., a layer of steel containing compounds of sulfur, nitrogen, and a metal.

In a further embodiment of this invention, a method for manufacturing a swash plate for a swash plate-type, variable displacement compressor is described. The compressor is driven by a drive shaft having a shaft axis. The swash plate comprises a boss that is penetrated slidably by the drive shaft. The boss is connected slidably to a rotor that is fixed to the drive shaft, whereby a variable, oblique angle is formed between a surface of the swash plate and the shaft axis. The method comprises the steps of connecting the boss securely within the swash plate and surface hardening by nitriding the boss, e.g., a layer of steel containing nitrides.

Other objects, features, and advantages of embodiments of this invention will be apparent to, and understood by, persons of ordinary skill in the art from the following description of preferred embodiments with reference to the accompanying drawings.

BRIEF DESCRIPTION OF THE DRAWINGS

Embodiments of the invention are described now with reference to the accompanying figures, which are given by way of example only, and are not intended to limit the present invention.

DETAILED DESCRIPTION OF PREFERRED EMBODIMENTS

Figure 2:
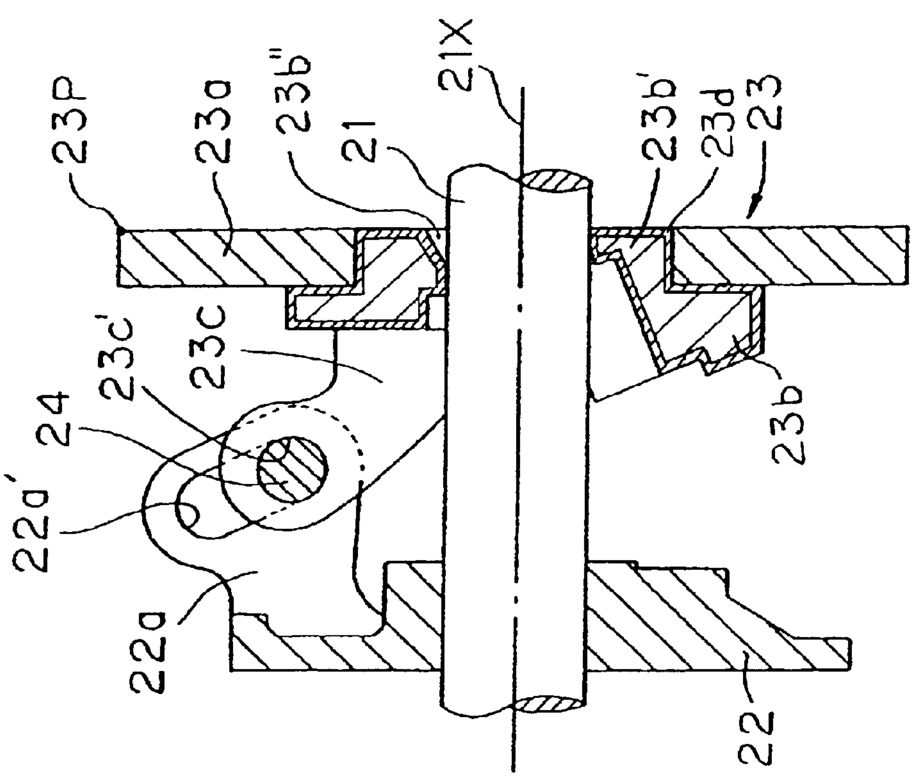
FIG. 2 is a cross-sectional view of a boss of a swash plate for a swash plate-type, variable displacement compressor that includes peripheral parts, at its minimum angle state, according to the embodiment of the present invention.
Figure 1:
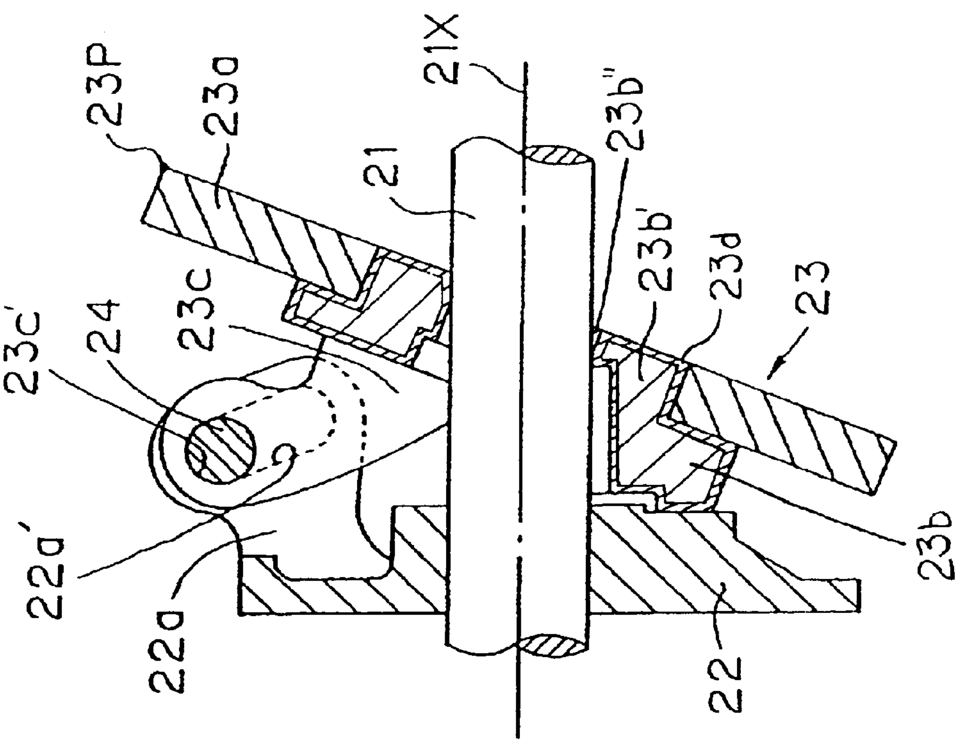
FIG. 1 is a cross-sectional view of a boss of a swash plate for a swash plate-type, variable displacement compressor that includes peripheral parts, at its maximum angle state, according to an embodiment of the present invention.

Referring to FIGS. 1 and 2, an embodiment of the present invention of a boss of a swash plate for a swash plate-type, variable displacement compressor (not shown) for use in an automobile air conditioning system (not shown) is shown. A rotor 22 is fixed to a drive shaft 21, so as to be rotatable with drive shaft 21. A swash plate 23 is connected to drive shaft 21, such that swash plate 23 may vary its oblique angle with respect to an axis 21X of drive shaft 21. Rotor 22 comprises two rotor arms 22*a* extending integrally towards swash plate 23, such that rotor arms 22*a* extend in parallel and are located on either side of a plane surface passing through axis 21X and a top point 23P of swash plate 23. Each of rotor arms 22*a* has an elliptical guide passage 22*a*' passing therethrough and extending perpendicular to the plane surface and formed at a terminal portion, such that guide passages 22*a*' are inclined below and towards axis 21X. Swash plate 23 comprises a body plate 23*a* and a boss 23*b*. Body plate 23*a* and boss 23*b* are made of a ferrous material. Boss 23*b* comprises an inserted portion 23*b*', a penetration hole 23*b*" formed through boss 23*b*, and two boss arms 23*c*. Inserted portion 23*b*' is connected securely, e.g., by press-fitting, within body plate 23*a*. Penetration hole 23*b*" is penetrated slidably by drive shaft 21, and penetration hole 23*b*" enables swash plate 23 to vary its oblique angle with respect to axis 21X. Each of boss arms 23*c* extends integrally from boss 23*b* toward rotor 22 in parallel, such that boss arms 23*c* are located on either side of the plane surface passing through by axis 21X and top point 23P, and also are located on either side of rotor arms 22*a*. Each of boss arms 23*c* has a circular hole 23*c*' passing therethrough and extending perpendicular to the plane surface and formed at a terminal portion of boss arms 23*c*. Boss arms 23*c* are connected to rotor arms 22*a*, slidably, by inserting two pins 24 through guide passages 22*a*' and holes 23*c*'. Pins 24 are adapted to slide within guide passages 22*a*'. Boss 23*b* is surface hardened to a high degree, e.g., a hardened surface layer 23*d* is formed, by nitriding or sulfur nitriding.

In the swash plate-type, variable displacement compressor including boss 23*b*, when drive shaft 21 is driven by an external power source (not shown), rotor 22 also rotates around axis 21X together with drive shaft 21. Boss 23*b* also is rotated by the rotor 22 via the connection mechanism comprising rotor arms 22*a*, guide passages 22*a*', pins 24, holes 23*c*', and boss arms 23*c*. Body plate 23*a* also is rotated by boss 23*b* via inserted portion 23*b*', connected securely, e.g., by press-fitting, within body plate 23*a*, and swash plate 23 also is rotated. Simultaneously with the rotation of boss 23*b*, boss 23*b* slides in an axial direction parallel to axis 21X on drive shaft 21, and pins 24 change their position within guide passages 22*a*', and swash plate 23 varies its oblique angle with respect to axis 21X. Simultaneously with the variations of the oblique angle of swash plate 23, pistons (not shown) reciprocate within cylinder bores (not shown) via sliding shoes (not shown) and vary their strokes. As a result, the displacement of the compressor (not shown) may be adjusted or varied.

Boss 23*b* is surface hardened substantially by nitriding or by sulfur nitriding. Material intended to have a hardness less than that of material that is subject to induction hardening may be hardened by nitriding or sulfur nitriding. Therefore, the method for processing boss 23*b* may be facilitated because material of boss 23*b* is made less hardened than material subject to induction hardening. Moreover, in such cases, the temperature for nitriding or sulfur nitriding may not be higher than the temperature for carburizing. Therefore, the deformation of boss 23*b* may be reduced or eliminated because the temperature for nitriding or sulfur nitriding boss 23*b* is a lower temperature than the temperature for carburizing. Further, boss 23*b* may not be hardened in the portion surrounding penetration hole 23*b*" by induction hardening. As a result, boss 23*b* may be connected securely by press-fitting within body plate 23*a* without reprocessing inserted portion 23*b*' of boss 23*b* to restore its original state after nitriding boss 23*b*. Moreover, boss 23*b* is nitrided substantially over its entire surface, and body plate 23*a* is not heat-treated. Therefore, inserted portion 23*b*' of boss 23*b* may not bite against body plate 23*a* when inserted portion 23*b*' is inserted within body plate 23*a*, and boss 23*b* may be connected securely within body plate 23*a* because the hardness of inserted portion 23*b*' is greater than the hardness of body plate 23*a*.

With respect to the embodiment of the present invention of a boss, inserted portion 23*b*' is connected securely by press-fitting within body plate 23*a*. Nevertheless, inserted portion 23*b*' may be connected securely by a bolt or a screw or other fastener within body plate 23*a*.

Although the embodiment of the present invention have been described in detail herein, the scope of the invention is not limited thereto. It will be appreciated by those skilled in the art that various modifications may be made without departing from the scope of the invention. Accordingly, the embodiment disclosed herein is only exemplary. It is to be understood that the scope of the invention is not be limited thereby, but is to be determined by the claims, which follow.

What is claimed is:

1. A swash plate for a swash plate-type, variable displacement compressor, such that said compressor is driven by a drive shaft having a shaft axis, comprising a boss slidably penetrated by said drive shaft and slidably connected to a rotor which is fixed to said drive shaft, whereby a variable, oblique angle is formed between a surface of said swash plate and said shaft axis, wherein said boss is connected securely within said swash plate and wherein said boss comprises a nitrided surface layer.

2. The swash plate of claim 1, wherein said boss is connected securely within said swash plate by press-fitting.

3. The swash plate of claim 1, wherein said boss further comprises an inserted portion, which is connected securely within said swash plate by press-fitting and wherein a boss arm securely connects the rotor to said drive shaft through a pin, such that said arm has a hole formed therethrough at a terminal portion of said boss arm to receive said pin.

4. A swash plate for a swash plate-type, variable displacement compressor, such that said compressor is driven by a drive shaft having a shaft axis, comprising a boss slidably penetrated by said drive shaft and slidably connected to a rotor which is fixed to said drive shaft, whereby a variable, oblique angle is formed between a surface of said swash plate and said shaft axis, wherein said boss is connected securely within said swash plate and wherein said boss comprises a sulfur nitrided surface layer.

5. The swash plate of claim 4, wherein said boss is connected securely within said swash plate by press-fitting.

6. The swash plate of claim 4, wherein said boss further comprises an inserted portion, which is connected securely within said swash plate by press-fitting and wherein a boss arm securely connects a rotor to said drive shaft through a pin, such that said boss arm has a hole formed therethrough at a terminal portion of said boss arm to receive said pin.

7. A swash plate-type, variable displacement compressor, such that said compressor is driven by a drive shaft having a shaft axis, comprising a swash plate and a boss, wherein said boss is penetrated slidably by said drive shaft and slidably connected to a rotor which is fixed to said drive shaft, whereby a variable, oblique angle is formed between a surface of said swash plate and said shaft axis, wherein said boss is connected securely within said swash plate and wherein said boss comprises a nitrided surface layer.

8. The compressor of claim 7, wherein said boss is connected securely within said swash plate by press-fitting.

9. The compressor of claim 7, wherein said boss further comprises an inserted portion, which is connected securely within said swash plate by press-fitting and wherein a boss arm securely connects the rotor to said drive shaft through a pin, such that said boss arm has a hole formed therethrough at a terminal portion of said boss arm to receive said pin.

10. A swash plate-type, variable displacement compressor, such that said compressor is driven by a drive shaft having a shaft axis, comprising a swash plate and a boss, wherein said boss is slidably penetrated by said drive shaft and slidably connected to a rotor which is fixed to said drive shaft, whereby a variable, oblique angle is formed between a surface of said swash plate and said shaft axis, wherein said boss is connected securely within said swash plate and wherein said boss comprises a sulfur nitrided surface layer.

11. The compressor of claim 10, wherein said boss is connected securely within said swash plate by press-fitting.

12. The compressor of claim 10, wherein said boss further comprises an inserted portion, which is connected securely within said swash plate by press-fitting and wherein a boss arm securely connects the rotor to said drive shaft through a pin, such that said boss arm has a hole formed therethrough at a terminal portion of said boss arm to receive said pin.

* * * * *